Feb. 14, 1950  R. W. STOHR  2,497,745
METALLURGICAL BRIQUET
Filed Aug. 28, 1948

INVENTOR.
Robert W. Stohr
BY
ATTORNEY

Patented Feb. 14, 1950

2,497,745

UNITED STATES PATENT OFFICE 2,497,745

METALLURGICAL BRIQUETTE

Robert W. Stohr, Niagara Falls, N. Y., assignor to The Carborundum Company, Niagara Falls, N. Y., a corporation of Delaware Application August 28, 1948, Serial No. 46,643

8 Claims. (Cl. 75—44)

This invention relates to the production of ferrous metal and improved articles made therefrom. More particularly it relates to the imparting to ferrous metal of desirable properties and the elimination of difficulties in connection therewith arising from the presence of impurities. In particular the present invention relates to the treatment of iron to be used in the making of cast iron articles in such manner as to produce improved characteristics therein.

In United States Patent Nos. 2,029,171 and 2,119,521, issued on the applications of William A. Brown, there has been described the use of granular silicon carbide as an agent for the improvement of cast iron. As therein set forth, it has been found that the addition of silicon carbide in comparatively small amounts to cast iron is effective to greatly alter the properties of castings made therefrom. This is particularly true of cast iron made from charges which contain high percentages of scrap iron and steel.

By the reaction of the silicon carbide, which is believed to take place in the slag zone, the distribution in the iron of various undissolved impurities is modified as are also the proportions and distribution of the free and combined carbon contained in the metal. The distribution of the graphite and impurities is such in the practice of the invention described in the abovementioned patents that defects in the cast metal resulting from warping and breakage are greatly reduced or eliminated even in articles having relatively thin sections. Moreover, the castings obtained are highly machineable and have a uniform fracture.

In the above-mentioned patents, it is suggested that the silicon carbide should be added to the cupola in which the iron is melted prior to casting. It is further suggested that the silicon carbide may be formed into lumps or briquets in various ways. It has been found, however, that the briquetting of silicon carbide in accordance with the disclosure of these patents is in many cases unsatisfactory as the briquets produced are in some cases of such nature as to quickly break down into fine particles which are blown out of the stack by the blast or, on the other hand, are so hard and refractory as not to permit complete reaction of the silicon carbide contained therein.

It is therefore an object of the present invention to provide a metallurgical briquet containing granular silicon carbide which will make possible the fullest utilization of the silicon carbide in the improvement of ferrous metals.

It is a further object of the invention to provide a bonded silicon carbide metallurgical briquet of such nature as to be easily handled and conveniently charged.

Still further objects of the invention are to provide a bonded silicon carbide metallurgical briquet which will be stable under storage conditions, resistant to the shocks and stresses of ordinary handling, and inexpensive to produce.

In the accompanying drawing.

Figure 1:
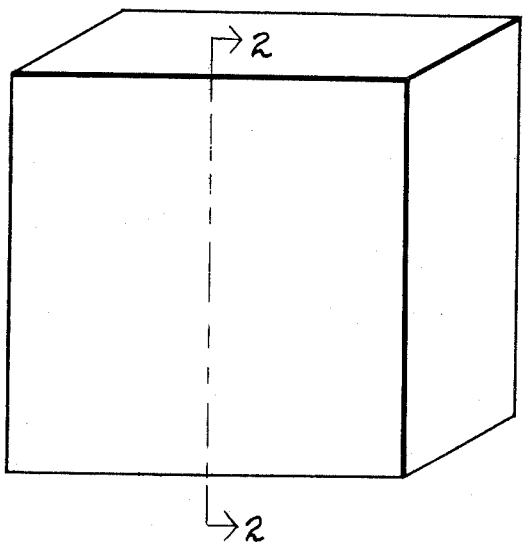
Figure 1 is a perspective view of a bonded briquet containing silicon carbide made in accordance with the present invention.
Figure 2:
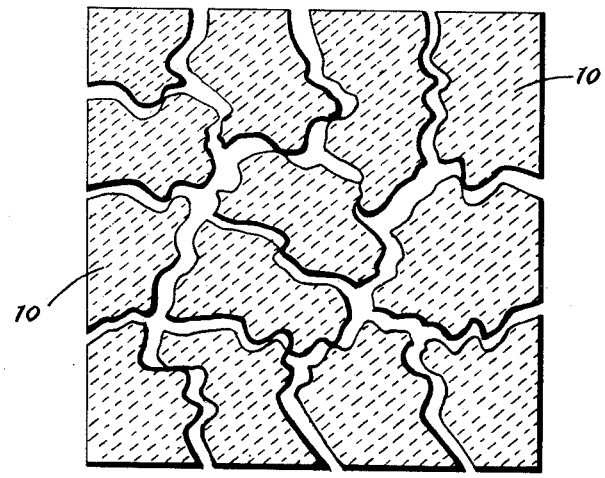
Figure 2 is a sectional (on line 2—2 of Figure 1) exploded view of a briquet such as that shown in Figure 1 which is representational of the disintegration of the briquet in accordance with the invention as hereinafter set forth, the fragments being designated by reference characters 10.

In the making of metallurgical briquets in accordance with the preseent invention any form of silicon carbide which is reasonably finely divided may be employed. Furthermore the purity of the silicon carbide to be used is not of critical importance except in so far as it is desirable to avoid the addition of undesirable elements to the ferrous metal. Accordingly, silicon carbide of grades which are not so desirable for abrasive use, such as dust collector fines, settling tank fines and refractory grade silicon carbide may be used. Indeed with proper account being taken of the associated impurities, such sources of silicon carbide as firesand and crushed scrap silicon carbide abrasive wheels and refractory products may be used.

According to the present invention, there is incorporated in bonded metallurgical briquets containing granular silicon carbide an ingredient which will produce when heated during the metallurgical process in which it is used, disintegration of the briquets into pieces which are small enough to allow complete reaction of the silicon carbide. It is, of course, desirable and contemplated that such disintegration shall not be of such completeness as to permit the silicon carbide to be blown out of the stack or otherwise eliminated from the furnace without reaction.

The material which I have found to be best for the purpose of causing disintegration of metallurgical briquets containing silicon carbide according to the present invention is the mineral called vermiculite, which is a mica-like material having the property of exfoliating or expanding, when heated, to many times its original volume. In thus expanding, the vermiculite exerts considerable pressure and granules thereof, when incorporated in a briquet, cause disruption of the briquet if the latter is subjected to a temperature of about 400° C. or more for a reasonable period of time. Such temperatures may be found some distance away from the hottest zones of metallurgical furnaces and consequently the briquets will disintegrate before reaching the point where reaction of the silicon carbide is desired. For the purpose of the present application "high temperature" is intended to mean a temperature of about 400° C. or above.

A number of bonds are available for making silicon carbide metallurgical briquets in accordance with the present invention. In prior U. S. Patent No. 2,119,521, above referred to, it has been suggested that various cements may be used as bonds for silicon carbide briquets intended for metallurgical use. It has been found that the incorporation of vermiculite in a cement bonded briquet causes satisfactory disintegration of the briquet at high temperatures. The following examples are representative of the composition of such briquets:

*Example I*

| | Per cent |
|---|---|
| Silicon carbide | 83 |
| Vermiculite | 1 |
| Portland cement | 16 |

The foregoing mix when mixed with water and allowed to set gives a briquet which is dense, hard and weather resistant. However, when used in the treatment of ferrous metal as, for example, in a cupola, the briquet will shatter before reaching the slag zone into pieces of sufficiently small size as to permit complete reaction of the silicon carbide in the briquet.

It has also been found that argillaceous bonds for silicon carbide may be employed in making metallurgical briquets. The advantage of such bonds is that instead of requiring molding, briquets of this type may be, if desired, formed by extrusion. An example of a dry mix for such a briquet is the following:

*Example II*

| | Per cent |
|---|---|
| Silicon carbide | 87 |
| Vermiculite | 1 |
| Albany clay | 6½ |
| Bentonite | 3 |
| Temporary bond | 2½ |

The temporary bond specified in this example may be any of the common ones used in the fabrication of ceramic articles. Among the more common of such temporary bonds are the lignin derivatives obtained from cellulose sulphite liquor and sold under various trade names. These have been found to be satisfactory. Briquets made in accordance with Example II by an extrusion process have been found to be resistant to breakage in handling after drying and to disintegrate satisfactorily in use.

The bonds set forth above are of such nature that the constituents thereof combine with and become part of the slag which lies over the ferrous metal. The bonds may thus be termed "slag-forming" bonds. Silicon carbide metallurgical briquets according to the present invention may, of course, also be prepared with other hard and more or less refractory bonds which may be found useful.

It has been found that the proportion of vermiculite granules necessary to produce shattering of briquets made in accordance with the present invention is quite small. It has also been found that to some extent the proportion required is dependent upon the fineness of the vermiculite. Very finely divided vermiculite has not been found to be very effective in causing disintegration of briquets, presumably because of the small volume of the expanded or exfoliated material located at any one place. It is therefore desirable to use vermiculite which is for the most part of such size as to be retained on a screen having 20 mesh to the linear inch. It is, of course, also undesirable to have the particles of vermiculite too coarse since the even distribution of a small proportion of vermiculite would thereby be made very difficult. In general, the particles ranging in size between those held on a screen having 4 mesh to the linear inch and a screen having 20 mesh to the linear inch are most convenient and practical for use in accordance with the present invention.

The proportion of vermiculite to be used in briquets of the character above described is not particularly critical so far as the upper end of the range is concerned. Indeed any amount up to quite large percentages may be used, it being remembered, of course, that the silicon carbide content of the briquets would consequently be reduced to what might be an undesirable extent. It has been found that effective shattering of the briquets may take place with as little as 0.5% vermiculite but it is preferred to use 0.75% to 1% as the minimum amount and about 1.5% as the maximum amount. Where very extensive disintegration is desired the maximum need be increased only to about only to about 4 or 5%.

In the actual production of cast iron, briquets made according to the present invention have been used very satisfactorily. It has been found that the silicon carbide of the briquets is completely reacted and no undesirable effects have been found from the use of vermiculite. The improvement in the quality and characteristics of the cast iron which was produced was similar to and as striking as the improvement described in prior U. S. Patent No. 2,020,171 mentioned above.

If it is desired, ingredients having other functions may also be included in the briquet composition. Thus, it is possible to include such materials as fluxes, soda ash and fluorspar, for example, being suitable, and alloying ingredients in briquets made according to the present invention. The alloying ingredients may be in the form of metal or metalloid or may be present as compounds thereof which will under the conditions of use of the briquets be reduced to the metal or metalloid.

Other materials may also be used to effect disintegration of the briquets. Among the materials which have also been found to be of use in this respect are the minerals scolecite, stilbite and perlite. These materials are considerably less effective than vermiculite but may be used in producing briquets which disintegrate satisfactorily.

A very high proportion of cast iron is produced in cupolas and it is therefore anticipated that the improved briquets made according to the present invention will find their principal usefulness as a cupola addition. However, such briquets may be used wherever need for them as a metallurgical addition occurs. Accordingly they will be useful in air furnaces, blast furnaces, and certain steel furnaces where slag reaction of the silicon carbide is desired.

The metallurgical briquets containing silicon carbide made according to the present invention are inexpensive to produce, possess the advantages of being easily handled and of resisting damage therefrom, of being stable under storage conditions, and of making available for complete reaction the silicon carbide and any other reactive materials contained therein. It is accordingly obvious that the use of such briquets will make the treatment of ferrous metal by silicon carbide easier and the results obtained more uniform.

By the term "vermiculite" as used herein, it is meant to include all micaceous minerals of exfoliating characteristics similar to the mineral material commonly known by that name. Since these materials are complex alumino-silicates it is frequently difficult if not impossible to accurately classify a particular specimen or lot of material as being a definite mineral.

When percentages are referred to in the foregoing specification and the claims percentages by weight are meant.

It will be realized that the foregoing description of the invention is intended for illustration only and is not intended to be restricting. Except as limited by the appended claims, the present invention is considered to be broad.

I claim:

1. A metallurgical briquet consisting essentially of silicon carbide, a bond and particles of vermiculite.

2. A metallurgical briquet consisting essentially of silicon carbide, a bond, and from 0.5 to 5% of vermiculite granules.

3. A metallurgical briquet consisting essentially of silicon carbide, a bond, and particles of a mineral material which exfoliates under the influence of heat.

4. A metallurgical briquet consisting essentially of silicon carbide, a cement bond, and particles of a mineral material which exfoliates under the influence of heat.

5. A metallurgical briquet consisting essentially of silicon carbide, a clay bond, and particles of a mineral material which exfoliates under the influence of heat.

6. A metallurgical briquet consisting essentially of silicon carbide, a bond, and particles of a mineral material which exfoliates under the influence of heat, said particles of mineral material ranging from 4 mesh to 20 mesh in particle size.

7. A bonded metallurgical briquet comprising a major proportion of silicon carbide, and containing 0.5–5% of vermiculite ranging from 4 mesh to 20 mesh in particle size.

8. A bonded metallurgical briquet comprising a major proportion of silicon carbide, and containing 0.5–5% of a mineral which exfoliates under the influence of heat, said mineral being in the form of granules from 4 mesh to 20 mesh in particle size.

ROBERT W. STOHR.

REFERENCES CITED

The following references are of record in the file of this patent:

UNITED STATES PATENTS

| Number | Name | Date |
| --- | --- | --- |
| 1,766,887 | Eulberg | June 24, 1930 |
| 1,869,925 | Turnbull | Aug. 2, 1932 |
| 2,020,171 | Brown | Nov. 5, 1935 |
| 2,079,110 | Easter et al. | May 4, 1937 |
| 2,119,521 | Brown | June 7, 1938 |
| 2,279,617 | Chantler | Apr. 14, 1942 |